United States Patent [19]
Johnson

[11] 4,053,889
[45] Oct. 11, 1977

[54] NON-LINEAR SPREAD SPECTRUM TRANSMITTER/RECEIVER FOR A HOMING SYSTEM

[75] Inventor: Robert H. Johnson, Scottsdale, Ariz.

[73] Assignee: Motorola, Inc., Schaumburg, Ill.

[21] Appl. No.: 709,052

[22] Filed: July 27, 1976

[51] Int. Cl.² ............................................. G01S 9/233
[52] U.S. Cl. ............................................. 343/17.2 PC
[58] Field of Search ................................. 343/17.2 PC

[56] References Cited

U.S. PATENT DOCUMENTS 3,430,241  2/1969  Loesch .......................... 343/17.2 PC
3,875,571  4/1975  Davis, Jr. et al. ........ 343/17.2 PC X Primary Examiner—T.H. Tubbesing
Attorney, Agent, or Firm—Eugene A. Parsons

[57] ABSTRACT

A spread spectrum transmitter/receiver in a pulse ranging system including surface acoustic wave devices with a nonlinear transducer to reduce frequency shift errors due to doppler effects.

2 Claims, 4 Drawing Figures

4,053,889

NON-LINEAR SPREAD SPECTRUM TRANSMITTER/RECEIVER FOR A HOMING SYSTEM

BACKGROUND OF THE INVENTION

Detection, track and homing systems, such as radar and sonar systems, have incorporated pulse compression/expansion processing for some time to maximize energy content of reflected target signals. In these systems a spread spectrum transmitter expands the pulse linearly many times the width of the original pulse before transmission. A spread spectrum receiver receives reflected pulses from a target and compresses the pulses linearly to the original width. The linear compression/expansion is adequate for slow moving targets, but high velocity targets severely limit maximum usable compression ratios when doppler distortion of the compressed pulse is significant. Because of doppler effects, a signal from a high velocity closing target will appear to have a higher carrier frequency, wider bandwidth, higher pulse repetition frequency and narrower pulse width. Therefore, attempts at matched filtering using pulse compression will result in considerable mismatch over a wide range of closing velocities. To keep the resultant error due to doppler effects within usable levels in a linear pulse compressing system, the closing velocities must be low to be tolerable in detection, track and homing radars and the closing velocity is too low to be tolerable in sonar or guided torpedo systems.

SUMMARY OF THE INVENTION

The present invention pertains to detection, track and homing systems including spread spectrum transmitter/receivers wherein surface acoustic wave devices are utilized to provide nonlinear expansion and compression of the pulses to reduce frequency shift errors due to doppler effects and to provide a match between expansion filters in the transmitter and compression filters in the receiver.

It is an object of the present invention to provide new and improved detection, track and homing systems including spread spectrum transmitter/receivers.

It is a further object of the present invention to provide new and improved detection, track and homing systems wherein surface acoustic wave devices are utilized for nonlinear frequency modulation to reduce errors due to doppler effects.

These and other objects of this invention will become apparent to those skilled in the art upon consideration of the accompanying specifications, claims and drawings.

BRIEF DESCRIPTION OF THE DRAWINGS

Referring to the drawings, wherein like characters indicate like parts throughout the figures.

DESCRIPTION OF THE PREFERRED EMBODIMENTS

Figure 1:
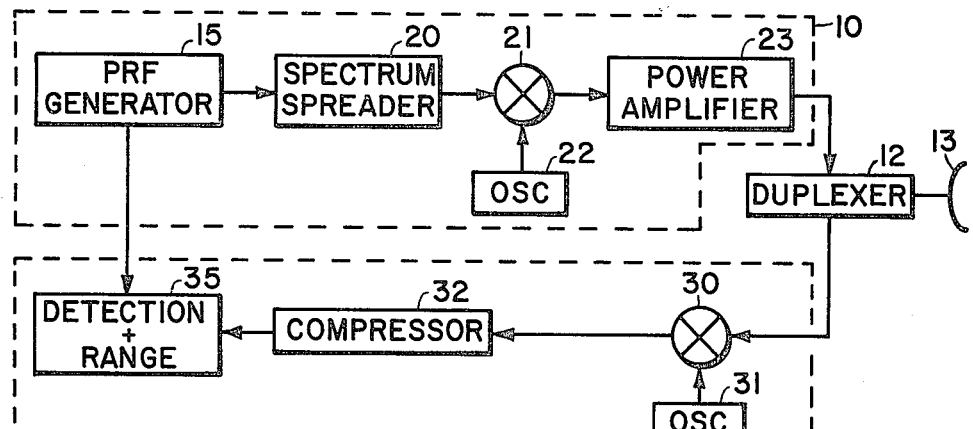
FIG. 1 is a block diagram of a detection, track and homing system embodying the present invention.

Referring specifically to FIG. 1, the numeral 10 generally designates a spread spectrum transmitter and the numeral 11 generally designates a spread spectrum receiver each connected through a duplexer 12 to an antenna 13. The transmitter 10, receiver 11, duplexer 12 and antenna 13 comprise a system for detection, track and homing on targets where the velocities between the system and the target are relatively high. In the simplified block diagram of FIG. 1, a pulse repetition frequency generator 15 is connected to a spectrum spreader 20, the output of which is connected to a mixer 21. A local oscillator 22 is also connected to the mixer 21 to raise the frequency from the spectrum spreader 20 to the desired frequency for transmission. The output from the mixer 21 is supplied through a power amplifier 23 to an input of the duplexer 12 where it is directed to the antenna 13.

Reflected pulses from a target are received at the antenna 13 and passed through the duplexer 12 to a mixer 30 in the receiver 11. A local oscillator 31 supplies mixing signals to the mixer 30 to lower the frequency of the incoming signal sufficiently so that it can be applied to a compressor 32. The output signals from the compressor 32 are applied to detection and range determining circuits 35. The detection and range determining circuits 35 also receive a signal from the generator 15 indicating the beginning of each transmitted pulse so that timing circuits can be energized to determine the range of targets.

Prior art detection, track and homing systems are constructed similar to the system illustrated in FIG. 1 except that a spectrum spreader having linear frequency modulation characteristics is utilized to spread the pulses and a compressor having matching characteristics is utilized to compress the return pulses in the receiver. Linear frequency modulation is adequate for slow moving targets but doppler effects introduce severe errors when targets with high velocity with respect to the velocity of propogation are being tracked. The reflected frequency from a moving target is given by the formula:

$$f_r = \frac{2 + V_D}{2 - V_D} f_t$$

where
$f_t$ = frequency transmitted
$f_r$ = frequency received
$V_D = 2\,v/c$
$v$ = velocity of target
$c$ = velocity of signal propagation
Therefore the doppler frequency shift $$f_d = f_r - f_t$$

or $$f_d = \frac{2 V_D}{2 - V_D} f_t$$

Figure 3:
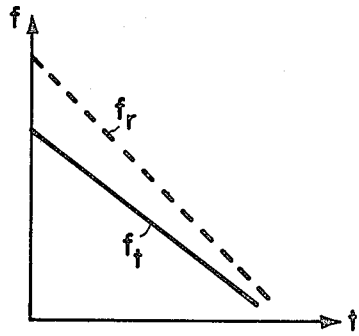
FIG. 3 is a graphic representation of the linear compression/expansion in prior art systems.

This frequency shift due to the doppler effects is illustrated graphically in FIG. 3 where the transmitted frequency, $f_t$, is illustrated by a solid line and the doppler frequency shift, $f_r$, is illustrated by the dotted line. The bandwidth, B, is also transformed, as illustrated by the following formula:

$$\Delta B = \frac{2 V_D}{2 - V_D} B$$

and the pulse width will be $\Delta T \simeq V_D T$ where $T$ is the pulse duration. Thus a signal from a closing target will appear to have a higher carrier frequency, wider bandwidth, higher pulse rate frequency and narrower pulse width. Therefore, attempts at matched filtering using pulse compression will result in considerable mismatch over a wide range of closing velocities.

To keep the resultant error due to doppler effects within usable levels, it can be shown that for a linearly swept FM pulse compression system the velocity is defined by the following formula:

$$V \simeq \frac{0.1 c}{TB}$$

The following example dramatically displays the velocity of targets which can be tolerated before errors due to doppler effects become intolerable. Assume for a torpedo in salt water where $c$ equals about 1500 meters per second, a $V$ of 35 knots (approximately $10^3$ meters per second), a $T$ of 2 seconds (for 30 meter range resolution and 100/1 pulse compression) and 50 Hz bandwidth. From above equation of parameters, closure rate must be less than:

$$V = \frac{0.1 \ (1500 \ m/sec)}{2 \ sec \cdot 50 \ Hz} = 1.5 \ m/sec = 2.69 \ knots$$

It can quickly be seen that restricting operations to the tracking of targets having a velocity less than 1.5 meters per second or 2.69 knots is impractical.

Figure 2:
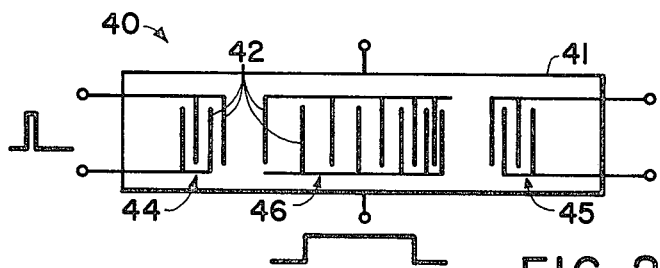
FIG. 2 is a schematic diagram of a surface acoustic wave device utilized for compression/expansion in the system of FIG. 1.

Referring specifically to FIG. 2, a surface acoustic wave device, generally designated 40, is illustrated. The device 40 includes a piezoelectric base 41 having a plurality of spaced apart interdigitated fingers 42 formed on a surface thereof and interconnected to provide a first input transducer 44, a second input transducer 45 and an output transducer 46. The transducers 44, 45 and 46 are acoustically coupled in a manner well known to those skilled in the art.

The spacing between the fingers 42 of the output transducer 46 is varied nonlinearly with the fingers 42 closest to the input transducer 44 being spaced the farthest apart and the fingers closest to the input transducer 45 having the lesser spacing therebetween. The nonlinear variation of spacings between the fingers 42 in the output transducer 46 are calculated to provide the greatest reduction in errors due to doppler effects and it has been found that the nonlinear variation generally follows a hyperbolic function. Utilizing the nonlinear device of FIG. 2, the frequency transmitted is represented by the solid line in FIG. 4 and the received doppler frequency shifted signal is represented by the dotted line in FIG. 4. It can be seen that the error simply appears as an additional delay of $t_s$ seconds, which can be neglected in active tracking and homing systems.

Figure 4:
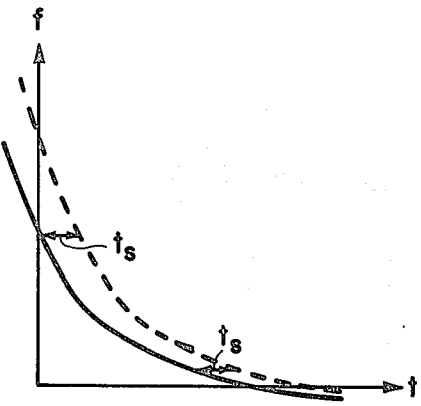
FIG. 4 is a graphic representation of the nonlinear compression/expansion of the present invention.

To utilize the device 40 of FIG. 2, a relatively narrow pulse applied to the input transducer 44 will appear at the output transducer 46 as a nonlinear, upwardly spread spectrum pulse (up chirp). If the same input pulse is applied to the input transducer 45 the output pulse will appear across the output transducer 46 as a nonlinear downwardly spread spectrum pulse (down chirp). Thus, the device 40 is utilized as the spectrum spreader 20 by supplying pulses from the generator 15 to either of the input transducer 44 or 45 and connecting the spread spectrum pulse from the output transducer 46 to the mixer 21. To utilize the device 40 as the compressor 32 in the receiver 11, the output transducer 46 is connected to the mixer 30 to receive the reflected spread spectrum pulse and the compressed pulse from the corresponding up or down chip output transducers 44 or 45 is connected to the detection and range determining circuits 35. As illustrated in FIG. 4, the received pulse is compressed in the same nonlinear fashion as the transmitted pulse is expanded and doppler effects are substantially nullified by the nonlinearity so that only the minor delay, $t_s$, appears.

Thus, by incorporating a surface acoustic wave device with nonlinear pulse spreading and compressing characteristics, errors due to doppler effects in the detection, tracking and homing of relatively high velocity targets are substantially reduced or eliminated. Through the use of the relatively inexpensive surface acoustic wave devices, the capability of approaching matched filters for target detection and tracking at high speeds can be realized. While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. In a detection, track and homing system including a spread spectrum transmitter adapted to transmit signals to a remotely located target and a spread spectrum receiver adapted to receive signals reflected from the target in response to the transmitted signals impinging thereon where the velocities between the transmitter/receiver and the target are relatively high, surface acoustic wave apparatus providing doppler invariant pulse compression/expansion comprising:
   a. a piezoelectric base;
   b. a plurality of spaced apart interdigitated fingers formed on a surface of said base and interconnected to provide an input transducer and an acoustically coupled output transducer; and
   c. the fingers forming the output transducer having spacings therebetween which vary nonlinearly in a generally hyperbolic function for reducing frequency shift errors due to doppler effects.

2. A detection, track and homing system for use where the velocities between the system and a target are relatively high, said system comprising:
   a. a spread spectrum transmitter and receiver;
   b. expansion filter means and compression filter means connected in said transmitter and receiver, respectively, for providing the spread spectrum signals, each of said filter means including a surface acoustic wave device having a nonlinear transducer with interdigitated fingers having spacings therebetween which vary in a generally hyperbolic function for reducing errors due to doppler effects.

* * * * *